(12) United States Patent
Richardson

(10) Patent No.: US 7,458,170 B1
(45) Date of Patent: Dec. 2, 2008

(54) AUTOMATIC CORD LENGTH MEASURING DEVICE

(76) Inventor: Shane D. Richardson, 2B Thurman, Nellis AFB, Las Vagas, NV (US) 89115

(*) Notice: Subject to any disclaimer, the term of this patent is extended or adjusted under 35 U.S.C. 154(b) by 7 days.

(21) Appl. No.: 11/708,229

(22) Filed: Feb. 20, 2007

Related U.S. Application Data

(60) Provisional application No. 60/774,042, filed on Feb. 17, 2006.

(51) Int. Cl.
G01B 3/12 (2006.01)
G01B 5/04 (2006.01)
B26D 7/28 (2006.01)

(52) U.S. Cl. .............. 33/734; 33/772; 33/732; 73/159; 83/522.19

(58) Field of Classification Search ........... 33/732–750, 33/752, 753, 756, 761, 769, 772–775, 777, 33/780–782; 73/159, 160; 83/522.19, 950
See application file for complete search history.

(56) References Cited

U.S. PATENT DOCUMENTS

| | | | | |
|---|---|---|---|---|
| 1,289,705 A * | 12/1918 | Eason | ............ | 33/747 |
| 2,136,457 A * | 11/1938 | Nixon | ............ | 33/749 |
| 2,576,629 A * | 11/1951 | Morby | ............ | 33/747 |
| 2,706,336 A | 4/1955 | Gruber | | |
| 2,876,549 A | 3/1959 | Adamson et al. | | |
| 3,253,337 A | 5/1966 | Ebert | | |
| 3,992,936 A * | 11/1976 | Clemens et al. | ............ | 73/160 |
| 4,400,882 A | 8/1983 | Thornton | | |
| 4,570,348 A | 2/1986 | Amsler | | |
| 4,768,290 A * | 9/1988 | Cooper | ............ | 33/756 |
| 4,798,003 A | 1/1989 | Haglof | | |
| 5,065,527 A | 11/1991 | Shaw | | |
| 5,245,760 A | 9/1993 | Smart et al. | | |
| 5,297,346 A * | 3/1994 | Weiner | ............ | 33/512 |
| 5,301,427 A * | 4/1994 | Swatek | ............ | 30/101 |
| 5,430,665 A | 7/1995 | Jin et al. | | |
| 6,129,796 A | 10/2000 | Steinberg et al. | | |
| 6,745,487 B1 | 6/2004 | Nield | | |
| 6,957,499 B2 * | 10/2005 | Roberts | ............ | 33/772 |
| 7,216,439 B2 * | 5/2007 | Thompson | ............ | 33/735 |
| 2008/0022544 A1 * | 1/2008 | Sawall et al. | ............ | 33/735 |

* cited by examiner

Primary Examiner—G. Bradley Bennett
Assistant Examiner—Amy Cohen Johnson
(74) Attorney, Agent, or Firm—Robert C. Montgomery

(57) ABSTRACT

An apparatus that accurately measures rope, wire, tubing and other materials is herein disclosed. A variety of different-sized models would possess different sized openings. One model with a one-inch opening would be used to measure small wire and cable. Another model with approximately a 3-inch opening would be used for larger electrical cables, rope, tubing and the like. An even large model would be available for measuring ductwork, hoses, and other large diameter material. As the material is pulled through the opening, an optical sensor, similar to that used on an optical computer mouse, accurately measures the material to the fraction of an inch. A mechanical sensor, utilizing a guide wheel is also envisioned. The length is displayed on a digital readout on the perimeter of the invention that is provided with a power button, reset button and the like. It is envisioned that various attachments such as a belt loop, a spool attachment and other items to increase the versatility of the invention would also be provided.

20 Claims, 6 Drawing Sheets

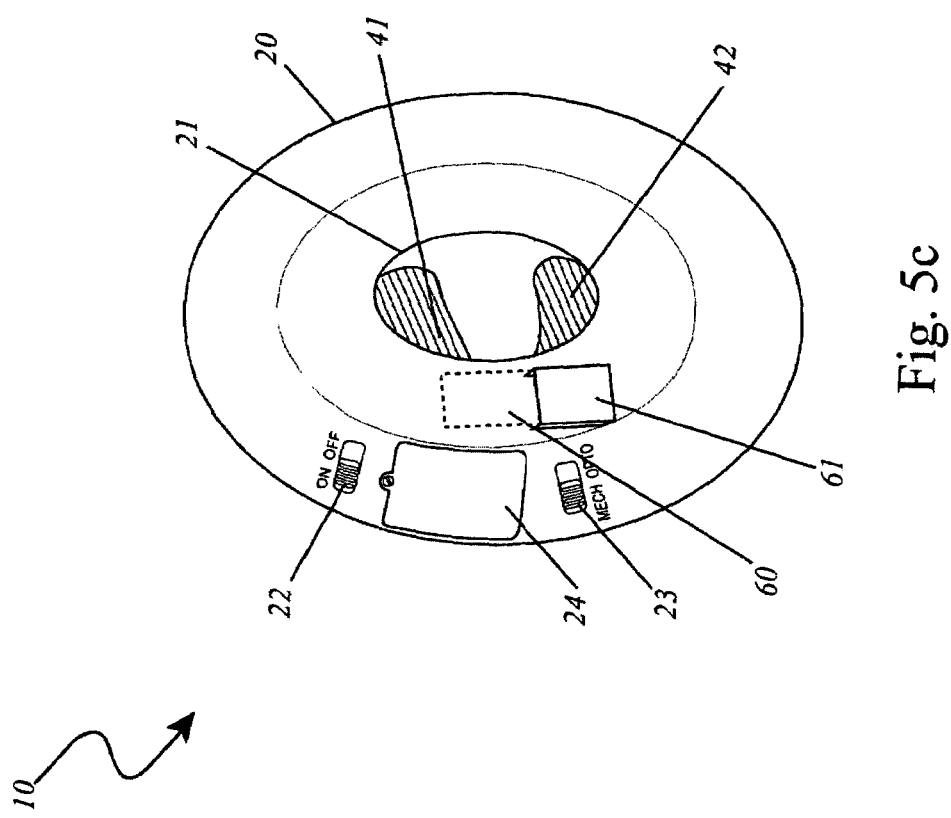

AUTOMATIC CORD LENGTH MEASURING DEVICE

RELATED APPLICATIONS

The present invention was first described in and claims the benefit of U.S. Provisional Application No. 60/774,042, filed Feb. 17, 2006, the entire disclosures of which are incorporated herein by reference.

FIELD OF THE INVENTION

The present invention relates generally to a system and method incorporating an apparatus to accurately measures rope, wire, tubing and other non-rigid material and, more particularly, to the measuring means being both mechanical and optical reader.

BACKGROUND OF THE INVENTION

One of the most common tools found in toolboxes of contractors and do-it-yourselfers is the tape measure. It is used in all stages of a project from the beginning planning stages, through detailed design, construction and final inspection. It provides extremely accurate measurements at a minimal cost. However, while a tape measure works great with rigid materials and fixed distances, it does not do so well with non-rigid materials such as rope, wire, cable, tubing and the like. Typically, the user must lay the material down and lay the tape measure along side it. This can be a source of inaccuracy. Also, on many jobsites, there is not enough room to lay such material out. All of these difficulties can lead to costly mistakes if material is cut to a wrong dimension.

Several attempts have been made in the past to develop a device for accurately measuring the length of rope, cord, chain, or other elongate device with a portable device. U.S. Pat. No. 6,129,796, in the name of Steinberg et al., discloses an apparatus and method for dispensing and labeling cord, wherein the apparatus has at leas tone spool of cord where one can measure a length of cord, and a label is applied to the cord. The Steinberg et al. apparatus is not an electronic counting apparatus that displays the amount of cord played out as in the present invention.

U.S. Pat. No. 5,430,665, in the name of Jin et al., teaches a length measuring apparatus for accurately measuring the length of communication cable in a moving state, combining a marking and encoding system, and a detection system. The Jin et al. device, unfortunately, is not designed for portability and cannot be held by hand. Additionally, the Jin et al. device marks the object during the length measuring process.

U.S. Pat. No. 5,065,527, in the name of Shaw, describes a length measuring and positive drive apparatus including two rotatable members that surround the product with an encoder, display device, and means to cut or mark pre-set lengths. The Shaw device is not easily portable and is not designed to be conveniently and comfortably held by hand. Also, the Shaw device does not also incorporate an optical sensing mechanism.

U.S. Pat. No. 5,245,760, in the name of Smart et al., discloses an apparatus for the lineal measurement of continuous or stranded materials, such as cloth, comprising a gravity-operated contact wheel which generated incremental distance pulses when rotated, an electric eye, a support base, and a display means. In addition to the aforementioned prior art, the Smart et al. design is not suitable for hand-held portability and also does not include an optical sensing mechanism.

U.S. Pat. No. 4,798,003, in the name of Haglöf, teaches a thread meter comprising a holder for a thread reel, a counter with a rotary measuring wheel, and guides for the thread. In addition to the aforementioned prior art, the Haglöf design is not suitable for hand-held portability and also does not include an optical sensing mechanism.

U.S. Pat. No. 4,570,348, in the name of Amsler et al., describes an apparatus for measuring length of elongate cable, with a pair of rotating rollers, a magnetically-activated switch, a pulse-transmitting device, and a receiver for counting and displaying the number of pulses. The Amsler et al. device does not have a logic function to calculate the measured length of elongate material that passes therethrough. The Amsler et al. apparatus also utilizes a magnetically-activated switch and does not comprise an optical sensing mechanism and therefore does not fall under the scope of the present invention.

U.S. Pat. No. 4,400,882, in the name of Thornton, discloses a system for marking cables employing optical devices for measuring the distance impressions.

None of the prior art particularly describes a portable device that utilizes mechanical and optical readers to accurately measure the length of an elongate substrate, such as rope, cord, chain, etc. Accordingly, there exists a need for a means by which measurement of non-rigid material can be accurately made without the disadvantages as described above.

SUMMARY OF THE INVENTION

In view of the foregoing disadvantages inherent in the prior art, it has been observed that there is need for an apparatus to accurately measure the length of an elongate material, such as wire, cord, rope, chain, or the like.

A further observation is that such an apparatus is needed to measure either a desired or entire length of such an elongate material with a portable and electronic device.

An object of the present invention is to provide such an apparatus in the design of a circular, disc-shaped housing with a central orifice comprising a sensor mechanism and a digital display module.

A further object of the present invention is to provide such a housing fabricated out of injection-molded plastic and said central orifice is preferably in the range between and including one and three inches in diameter.

A further object of the present invention provides for such an apparatus further comprising a circuit board with integral power distribution, sensor input processing, logic processing, and output data processing, and a power supply comprising batteries.

Another object of the present invention provides for said logic processing including means to process said sensor input into a measured length output display.

Still another object of the present invention is to provide a mechanical sensor mechanical sensor further comprising a stationary roller providing an idler means as said elongate material is fed through said central portal opening; a compliant roller oriented opposite from said stationary roller; a rotary encoder attached to said compliant roller, providing a continuous pulsing signal for calculation of said measured length; a roller bracket comprising an attachment means to said compliant roller with a pair of compression springs, thereby providing a spring force to said compliant roller; and, an adjustor assembly, comprising a threaded member with a knob, wherein said adjustment of said adjustor assembly applies and releases said spring force, thereby enabling said compliant roller to provide a spring-loaded contact with said elongate material as it is fed through said central portal opening.

Still another object of the present invention is to provide an optical sensor that emits an optical beam comprising a suitable resolution, thereby providing said input signal to said circuit board for calculation of said measured length.

Still another object of the present invention provides a digital display module, further comprising a user interface display for display of said measured length of said elongate material upon receipt of said output signal of said circuit board; and, a reset button located adjacent to said user interface display and in electrical communication with said circuit board for providing a reset signal, thereby returning the user interface display to zero.

Still another object of the present invention provides for said user interface display comprising a light emitting diode display (LED) or a liquid crystal diode display (LCD) in both English and metric units.

Yet another object of the present invention provides for said housing to further comprise various attachment means including at least one of the following list: hooks, clamps, or belt adapters.

Yet another object of the present invention provides for said housing to further comprise integrated material cutting attachments.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
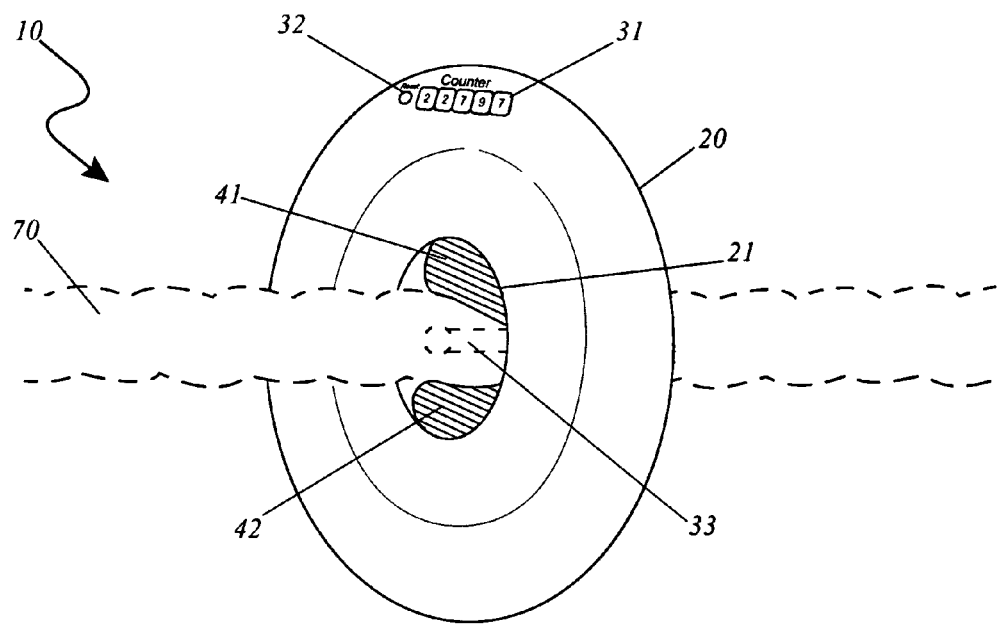
FIG. 1 is a front perspective view of the automatic cord length measuring device 10, according to a preferred embodiment of the present invention.

| 10 | automatic cord length measuring device |
|---|---|
| 20 | housing |
| 21 | portal opening |
| 22 | on/off switch |
| 23 | selector switch |
| 24 | battery compartment |
| 30 | display module |
| 31 | digital display |
| 32 | reset button |

-continued

| 33 | optical beam |
|---|---|
| 34 | optical sensor |
| 35 | rotary encoder |
| 36 | circuit board |
| 41 | stationary roller |
| 42 | compliant roller |
| 43 | spring |
| 44 | adjuster |
| 45 | knob |
| 46 | roller bracket |
| 50 | hook |
| 51 | clamp |
| 52 | belt adapter |
| 60 | cutting attachment |
| 61 | cutting attachment housing |
| 70 | material |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for an automatic cord length measuring device (herein described as the "apparatus") 10, which provides a means for accurately measuring the length of various materials 70 such as rope, wire, tubing, and the like. The apparatus 10 takes the form of a circular disk shaped housing 20, with a central portal opening 21. Various sized models are envisioned to provide different sized portal openings 21 for measuring a variety of materials 70 therein. As material 70 is pulled through the portal opening 21, a selection of two (2) measurement techniques is provided being an optical sensor 34 method or a mechanical sensor 35 based upon the type of material 70 to be measured. The length of said material 70 is then displayed on a digital display 31 located at the perimeter of the apparatus 10.

Referring now to FIG. 1, a front perspective view of the apparatus 10, according to the preferred embodiment of the present invention, is disclosed. The apparatus 10 comprises a housing 20, a portal opening 21, an optical beam 33, a stationary roller 41, a compliant roller 42, a digital display 31, and a reset button 32. The housing 20 comprises a circular disk shape plastic molding providing a convenient hand-held profile. The housing 20 is envisioned to be made using an injection molding process being common in the art. The portal opening 31 is centrally located and is envisioned to be provided in a variety of diameter ranges of approximately one (1") inch to three (3") inches thereby corresponding to particular material sizes 70 to be measured. The portal opening 21 provides two (2) means of measurement being an optical 34 and a mechanical measuring 41, 42 means. The optical beam 33 is emitted from an optical sensor 34 (not shown) thereby providing a non-contact means of measuring the material 70 (see FIG. 3 description). The rollers 41, 42 provide an alternate mechanical means of measurement. The stationary roller 41 provides an idler means as the material 70 is pulled through the portal opening 21. The compliant roller 42 provides a spring force against said material 70 securely holding it between the two (2) rollers 41, 42 during the measurement procedure. The contact rollers 41, 42 further provide an encoder signal 35 (not shown) thereby producing an accurate measurement of said material 70 (see FIGS. 3 and 4). The digital display 31 and accompanying reset button 32 are located at the perimeter of the apparatus 10 and provide a user interface display of the measured length of the material 70. The digital display 31 is envisioned using common electronic technology such as a light emitting diode display (LED), a liquid crystal diode display (LCD), or the like. The digital display 31 is envisioned to provide a display of both English and metric units. The reset button 32 provides a reset signal thereby returning the digital display 31 to zero (see FIGS. 3 and 4).

Figure 2:
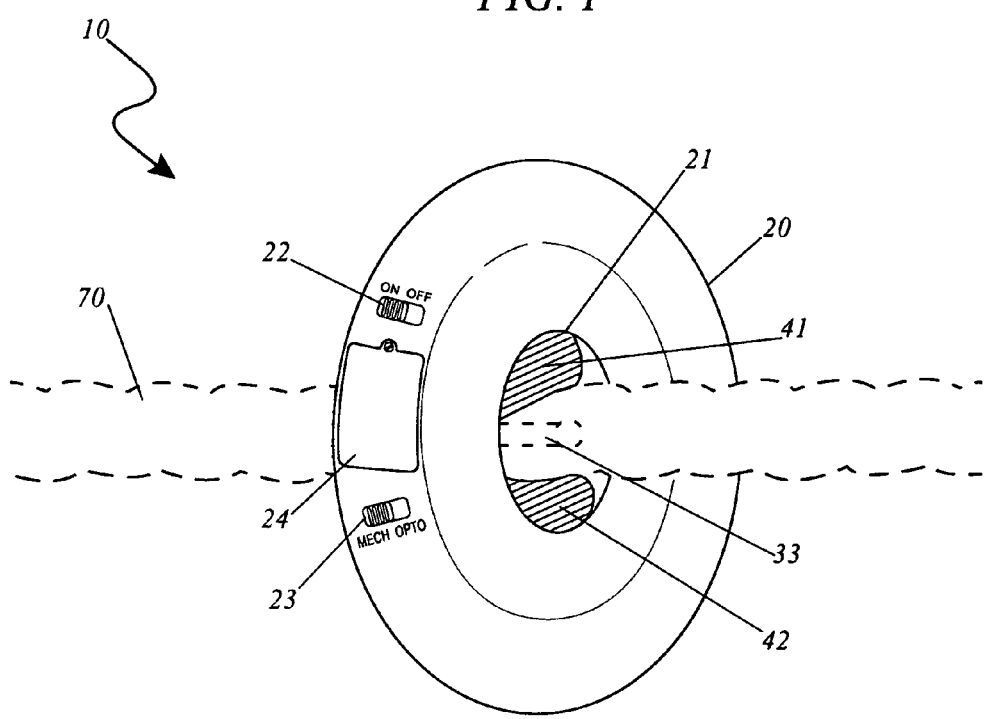
FIG. 2 is a rear perspective view of the invention 10, according to a preferred description of the present invention.

Referring now to FIG. 2, a rear perspective view of the apparatus 10, according to the preferred embodiment of the present invention, is disclosed. The apparatus 10 comprises a housing 20, a portal opening 21, an optical beam 33, a stationary roller 41, a compliant roller 42, an on/off switch 22, a selector switch 23, and a battery compartment 24. The on/off switch 22 provides a means for switching the direct current (DC) power source contained therein the battery compartment 24, to the electronics of the apparatus 10. The selector switch 23 provides a switching means between the optical measurement method and the mechanical measurement method. The on/off switch 22 and the selector switch 23 are envisioned to be standard sliding panel mounted single-pole, single throw switches common in the industry. The battery compartment 24 comprises a latching enclosure for a plurality of preferably AA-size batteries; however, may utilize various voltages and quantities of battery combinations.

Figure 3:
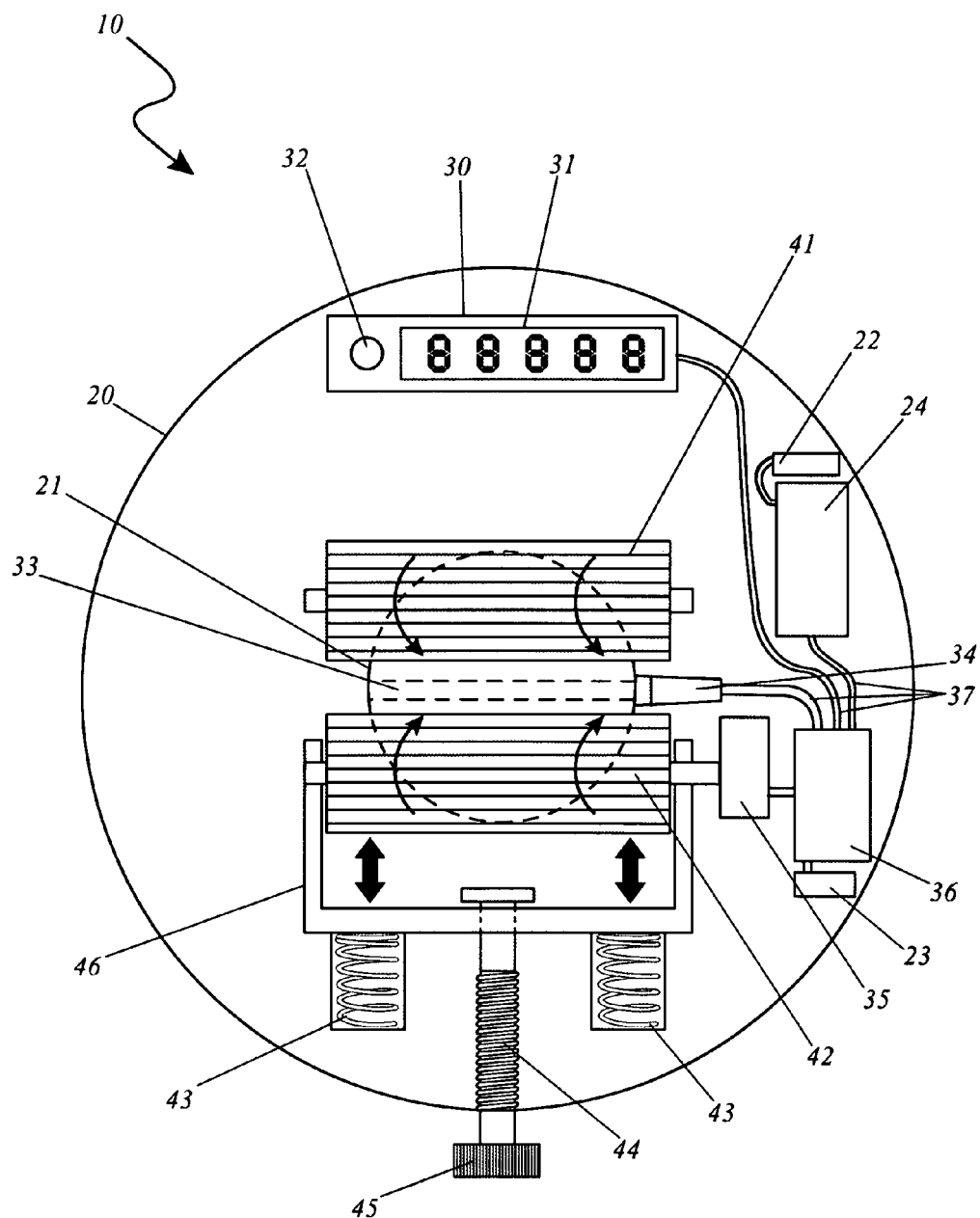
FIG. 3 is an internal break-away view of the automatic cord length measuring device 10, according to a preferred embodiment of the present invention.

Referring now to FIG. 3, an internal breakaway view of the apparatus 10, according to the preferred embodiment of the present invention, is disclosed. The apparatus 10 comprises a housing 20, a portal opening 21, an on/off switch 22, a selector switch 23, a battery compartment 24, a display module 30, a digital display 31, a reset button 32, an optical beam 33, an optical sensor 34, a rotary encoder 35, a circuit board 36, a stationary roller 41, a compliant roller 42, a pair of springs 43, an adjuster 44, a knob 45, and a roller bracket 46.

The roller bracket 46 provides an attachment means to the compliant roller 42, the pair of springs 43 and the adjustor 44 thereby allowing the compliant pulley 42 to make spring-loaded contact with the material 70 in a floating and compliant manner thereby conforming to the contour of said material 70. The springs 43 are envisioned to be standard compression springs common in the industry. The adjustor 44 provides a spring release means for the compliant roller 42 and is envisioned to be a threaded shaft type device being thereby affixed to the housing 20. The adjusting knob 45 being attached to the end of the adjustor 44 thereby providing a manual adjusting means to apply and release the spring force 43 being applied to the material 70.

The apparatus 10 as illustrated here depicts interconnecting wiring 37 between the major electronic components and the circuit board 36. The circuit board 36 provides control electronics and software to operate the apparatus 10. The optical beam 33 is emitted via an optical sensor 34 being connected thereto the circuit board 36. The optical sensor 34 comprises a sensor similar to that used on an optical computer mouse common in the industry; however, other commercially available measuring devices may be provided such as various optical measuring devices, as well as laser diode type devices and as such, should not be interpreted as a limiting factor of the present invention 10. The optical sensor 34 comprises a suitable resolution thereby providing an accurate measurement the material 70. The rotary encoder 35 is attached to the compliant roller 42 and provides a continuous pulsing signal to the circuit board 36 for calculation of the measured length. The rotary encoder 35 is envisioned to be a miniature shaft mount type encoder common in the industry.

Figure 4:
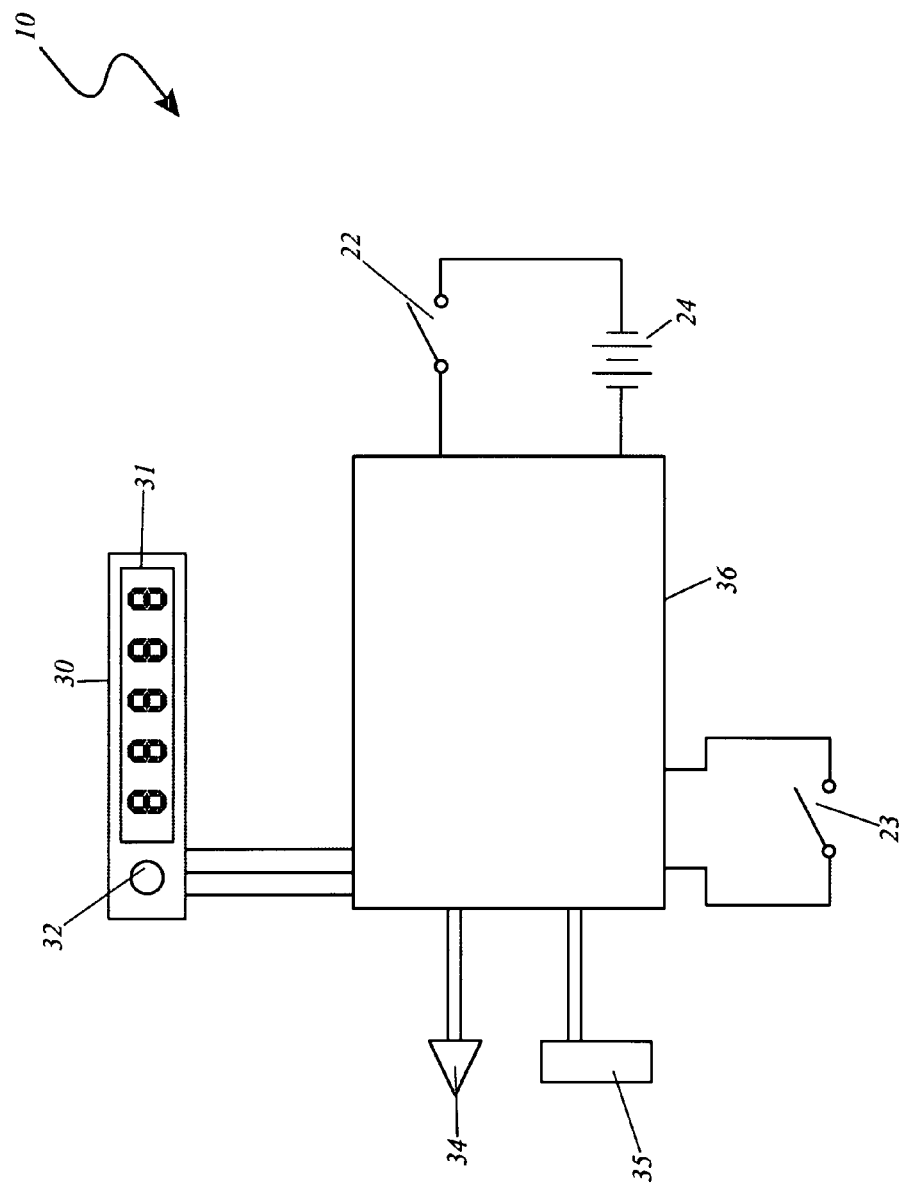
FIG. 4 is an electrical block diagram of the automatic cord length measuring device 10, according to a preferred embodiment of the present invention.

Referring now to FIG. 4, an electrical block diagram of the electronic portion of the apparatus 10, according to the preferred embodiment of the present invention, is disclosed. The apparatus 10 is illustrated here depicting a circuit of interconnecting wiring 37 between various electronic components and a circuit board 36. The said electrical components include an on/off switch 22, a selector switch 23, a battery compartment 24, a display module 30, an optical sensor 34, and a rotary encoder 35. The circuit board 36 receives direct current (DC) power when a single pole-single throw switch 22 is manually activated thereby enabling DC power to flow from a plurality of batteries 24. The circuit board 36 comprises custom circuits and components common in the electronics industry and thereby performs functions such as power distribution, data input/output, and logic processing. The circuit board 36 further comprises embedded software to process data using technologies such as read-only-memory (ROM), or the like. The circuit board 36 processes pulse and optical type input data and thereby calculates the length of the material 70 via said software. Said input data is provided to the circuit board 36 via an optical sensor 34 or a rotary encoder 35 based upon the selected measuring mode 23. The circuit board 36 then provides output data to a digital display module 30. The digital display module 30 further comprises particular user interface components being a numeric digital display 31 and a reset button 32. The numeric digital display 31 provides visible measurement information in feet and inches or meters. The reset button 32 provides a means to return the numeric digital display 31 to zero. It is also envisioned that selection of the desired measurement units may be obtained by pressing and holding the reset button.

Figure 5A:
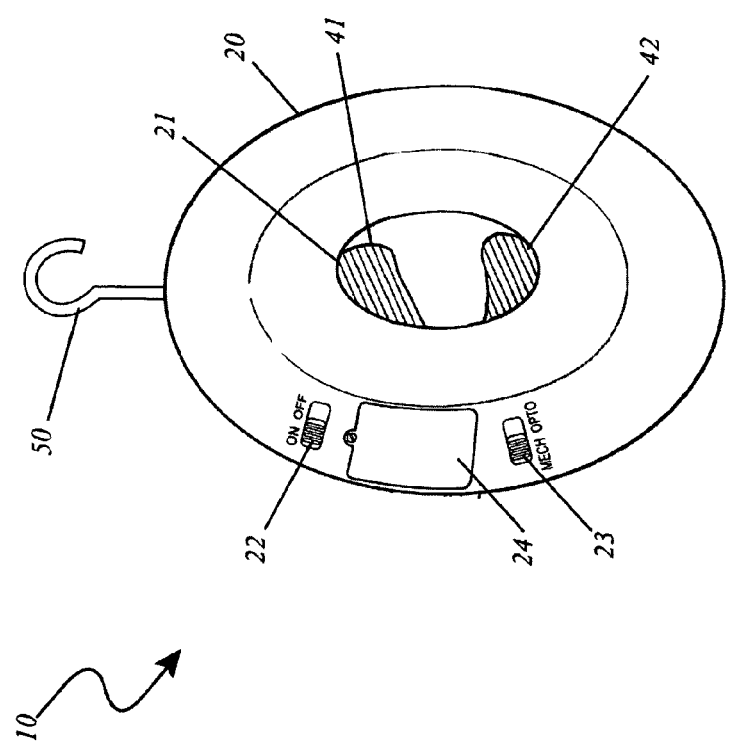
FIG. 5a is a rear perspective view of the invention 10, according to an alternate description of the present invention.
Figure 5B:
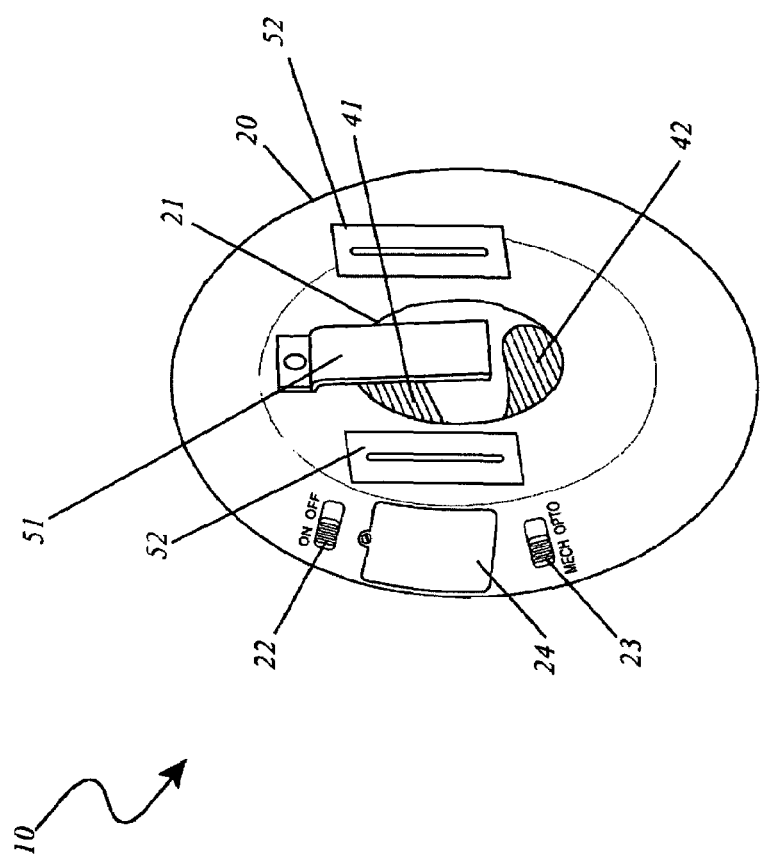
FIG. 5b is a rear perspective view of the invention 10, according to another alternate description of the present invention; and, FIG. 5c is a rear perspective view of the invention 10, according to yet another alternate description of the present invention.

FIGS. 5a through 5c represent rear perspective views of various alternate embodiments of the present invention 10. More particularly, FIG. 5a illustrates the present invention 10 comprising a hook 50 attachment thereon the housing 20. FIG. 5b depicts a clamp 51 and belt adapter 52 thereon the housing 20. Both FIGS. 5a and 5b depict alternate attachment means therefor the present invention 10 thereon a user. FIG. 5c illustrates a cutting attachment 60 stored within a cutting attachment housing integrated thereon the housing 20 for providing a user a material cutting means.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user, who has little or no training, in a simple and effortless manner with. After initial purchase or acquisition of the apparatus 10, it would be utilized as indicated in FIGS. 1 and 2.

The method of utilizing the apparatus 10 may be achieved by performing the following steps: selecting the appropriate model of the apparatus 10 based upon the physical size of the material 70 to be measured; activating the apparatus 10 by moving the on/off switch 22 to the ON position; resetting the numeric digital display 31 to zero by pressing the reset button 32 and verifying that the digital display 31 reads zero; feeding the material 70 through the portal opening 21 until obtaining the desired length or feeding all the available material 70 through the portal opening 21 to calculate the total length of the material 70; and, making a note of the digital display reading 31, pressing the reset button 32, and repeating the measurement procedure as many times as required.

An alternative embodiment of the present invention 10 comprises various attachment means such as hooks 50, clamps 51, belt adapters 52, or the like to secure the apparatus 10 to personnel, cable spools, various equipment, and the like based upon the intended application.

Another alternative embodiment of the present invention 10 comprises a graduated series of models of the apparatus 10 with varying portal opening sizes 21 of up to approximately twelve (12") inches thereby measuring large commercial and construction materials 70 such as, but not limited to, large piping, hose, or the like.

Another alternative embodiment of the present invention 10 comprises a more economical model thereby providing only an optical sensor 34 type measurement means.

Yet another alternative embodiment of the present invention 10 comprises a second more economical model thereby providing only a mechanical type measurement means using the aforementioned contact rollers 41, 42.

Yet another alternative embodiment of the present invention 10 comprises integrated material cutting attachments 60 residing therein a cutting attachment housing 61, which could be applied to specific families of materials 70 such as hose, plastic piping, and the like.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A device for accurately measuring a length of elongate material by means of a mechanical measuring system and an optical measuring system either independently of each other or in combination, comprising:
    a circular disk-shaped housing with a central portal opening;
    an electronic operating means;
    a mechanical sensor utilizing said mechanical measuring system located within said housing;
    an optical sensor utilizing said optical measuring system located within said housing; and,
    a digital display module located thereon a perimeter of said housing;
    a selector switch in electrical communication with said circuit board, for
    providing a selected measuring mode, comprising said mechanical or optical measuring system;
    and,
    wherein said elongate material is fed through said central portal opening such that said length can be accurately measured.

2. The device of claim 1, wherein said electronic operating means further comprises:
    a power supply;
    an on/off switch in electrical communication with said power supply,
    a circuit board in electrical communication with said on/off switch, further comprising control electronics and software to calculate a measured length upon receipt of an input signal from said mechanical sensor or optical sensor, and generating an output display signal comprising said measured length to said digital display.

3. The device of claim 2, wherein said power supply is derived from batteries supported within a battery compartment located within said housing.

4. The device of claim 3, wherein said mechanical sensor further comprises:
    a stationary roller depending downward within said central portal opening, wherein said stationary roller provides an idler means as said elongate material is fed through said central portal opening;
    a compliant roller oriented opposite from said stationary roller;
    a rotary encoder in electrical communication with said circuit board located within said housing and attached to said compliant roller, providing said input signal in the form of a continuous pulsing signal to said circuit board for calculation of said measured length;
    a roller bracket comprising an attachment means to said compliant roller and affixed within said housing with a pair of compression springs, thereby providing a spring force to said compliant roller; and,
    an adjustor assembly, comprising a threaded member with a knob at a first end and attached to said roller bracket at a second end, wherein said adjustment of said adjustor assembly applies and releases said spring force, thereby enabling said compliant roller to provide a spring-loaded contact with said elongate material as it is fed through said central portal opening.

5. The device of claim 4, wherein said rotary encoder comprises a miniature shaft mount-type encoder.

6. The device of claim 5, wherein said optical sensor is in electrical communication with said circuit board and emits an optical beam comprising a suitable resolution, thereby providing said input signal to said circuit board for calculation of said measured length.

7. The device of claim 6, wherein said digital display module further comprises:
    a user interface display for display of said measured length of said elongate material upon receipt of said output signal of said circuit board; and,
    a reset button located adjacent to said user interface display and in electrical communication with said circuit board for providing a reset signal, thereby returning the user interface display to zero.

8. The device of claim 7, wherein said user interface display comprises a light emitting diode display (LED) or a liquid crystal diode display (LCD) in both English and metric units.

9. The device of claim 8, wherein said central portal opening comprises a range of diameters between and including one inch to three inches.

10. The device of claim 9, wherein said housing comprises various attachment means including at least one of the following list: hooks, clamps, or belt adapters.

11. The device of claim 9, wherein said housing comprises integrated material cutting attachments.

12. A device for accurately measuring a length of elongate material by means of a portable measuring system comprising:
- a circular disk-shaped housing with a central portal opening in the range between and including one and three inches in diameter;
- a mechanical sensor utilizing a mechanical measuring system located within said housing;
- an optical sensor utilizing an optical measuring system located within said housing;
- an electronic operating means, comprising:
    - a power supply derived from batteries supported within a battery compartment located within said housing;
    - an on/off switch in electrical communication with said power supply,
    - a circuit board in electrical communication with said on/off switch, further comprising control electronics and software to calculate a measured length upon receipt of an input signal from said mechanical sensor or optical sensor, and generating an output display signal comprising said measured length to said digital display; and,
    - a selector switch in electrical communication with said circuit board, for providing a selected measuring mode, comprising said mechanical or optical measuring system;
- a digital display module located thereon a perimeter of said housing; comprising a user interface display of either a light emitting diode display (LED) or a liquid crystal diode display (LCD) in both English and metric units, said user interface display for display of said measured length of said elongate material upon receipt of said output signal of said circuit board and a reset button located adjacent to said user interface display and in electrical communication with said circuit board for providing a reset signal, thereby returning the user interface display to zero; and,
- wherein said elongate material is fed through said central portal opening such that said length can be accurately measured.

13. The device of claim 12, wherein said measuring system, further comprising:
- a stationary roller depending downward within said central portal opening, wherein said stationary roller provides an idler means as said elongate material is fed through said central portal opening;
- a compliant roller oriented opposite from said stationary roller;
- a rotary encoder in electrical communication with said circuit board located within said housing and attached to said compliant roller, providing said input signal in the form of a continuous pulsing signal to said circuit board for calculation of said measured length;
- a roller bracket comprising an attachment means to said compliant roller and affixed within said housing with a pair of compression springs, thereby providing a spring force to said compliant roller;
- an adjustor assembly, comprising a threaded member with a knob at a first end and a attached to said roller bracket at a second end, wherein said adjustment of said adjustor assembly applies and releases said spring force, thereby enabling said compliant roller to provide a spring-loaded contact with said elongate material as it is fed through said central portal opening.

14. The device of claim 13, wherein said rotary encoder comprises a miniature shaft mount-type encoder.

15. The device of claim 14, wherein said housing comprises various attachment means including at least one of the following list: hooks, clamps, or belt adapters.

16. The device of claim 14, wherein said housing comprises integrated material cutting attachments.

17. The device of claim 12, wherein said measuring system wherein said optical sensor is in electrical communication with said circuit board, and emits an optical beam comprising a suitable resolution, thereby providing said input signal to said circuit board for calculation of said measured length.

18. The device of claim 17, wherein said housing comprises various attachment means including at least one of the following list: hooks, clamps, or belt adapters.

19. The device of claim 17, wherein said housing comprises integrated material cutting attachments.

20. A method of accurately measuring a length of an elongate material by means of a portable measuring system, comprising the steps of:
- providing said system, further comprising:
    - circular disk-shaped housing with a central portal opening in the range between and including one and three inches in diameter;
    - a mechanical sensor utilizing a mechanical measuring system located within said housing;
    - an optical sensor utilizing an optical measuring system located within said housing;
- an electronic operating means, comprising:
    - a digital display module located thereon a perimeter of said housing; comprising a user interface display of either a light emitting diode display (LED) or a liquid crystal diode display (LCD) in both English and metric units, said user interface display for display of said measured length of said elongate material upon receipt of said output signal of said circuit board and a reset button located adjacent to said user interface display and in electrical communication with said circuit board for providing a reset signal, thereby returning the user interface display to zero;
- providing power to said system by installing batteries into said battery compartment;
- activating said system by switching said on/off switch to an ON position;
- resetting said digital display module to zero by pressing said reset button to acquire a zero display, and verifying that said user interface display reads zero;
- selecting a desired measuring system by switching said selector switch to either an OPTO position, thereby selecting said optical measuring system, or to an MECH position, thereby selecting said mechanical measuring system;
- feeding said elongate material therethrough said central portal opening until obtaining a desired length, or feeding an entire length of said elongate material therethrough said central portal opening to calculate a total length of said elongate material;
- acquiring said measured length via said desired measuring system;
- making a note of said measured length displayed thereon said user interface display; and,
- repeating said method as many times as required by depressing said reset button to reacquire said zero display.

* * * * *